United States Patent
Lee et al.

(10) Patent No.: US 12,493,227 B2
(45) Date of Patent: Dec. 9, 2025

(54) CAMERA MODULE AND ELECTRONIC DEVICE

(71) Applicant: HUAWEI TECHNOLOGIES CO., LTD., GuangDong (CN)

(72) Inventors: Kuni Lee, Shenzhen (CN); Shusheng Peng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 17/888,960

(22) Filed: Aug. 16, 2022

(65) Prior Publication Data
US 2022/0390813 A1    Dec. 8, 2022

Related U.S. Application Data (63) Continuation of application No. PCT/CN2021/074243, filed on Jan. 28, 2021.

(30) Foreign Application Priority Data

Feb. 17, 2020   (CN) .......................... 202020175513.7

(51) Int. Cl.
*G03B 13/34*     (2021.01)
*G02B 27/64*     (2006.01)
(Continued)

(52) U.S. Cl.
CPC ........... *G03B 13/34* (2013.01); *G02B 27/646* (2013.01); *G03B 5/00* (2013.01); *G03B 9/06* (2013.01);
(Continued)

(58) Field of Classification Search
CPC . G03B 13/34; G03B 5/00; G03B 9/06; G03B 30/00; G03B 2205/0007;
(Continued)

(56) References Cited

U.S. PATENT DOCUMENTS

2013/0201392 A1   8/2013  Gutierrez
2017/0054883 A1*  2/2017  Sharma ................. H04N 23/66
(Continued)

FOREIGN PATENT DOCUMENTS

CN      106470303 A    3/2017
CN      108181775 A    6/2018
(Continued)

*Primary Examiner* — Pinping Sun
*Assistant Examiner* — Alaina Marie Swanson
(74) *Attorney, Agent, or Firm* — Rimon PC (57) ABSTRACT

A camera module includes a camera motor, a lens, an image sensor assembly, and a variable aperture. The camera motor includes a focusing part, and the focusing part includes a base, a carrier, and a driver. The driver is fastened to the base and is configured to drive the carrier to move relative to the base in a specified direction. The carrier forms an installation hole in a specified direction. The lens is fastened in the installation hole, and an optical axis of the lens is parallel to the specified direction. The variable aperture is fastened on the carrier and located on a light incoming side of the lens. The image sensor assembly is disposed at one end of that is of the base and that is away from the variable aperture. Both of the variable aperture and the lens are disposed on the carrier of the focusing part.

16 Claims, 9 Drawing Sheets

(51) Int. Cl.
*G03B 5/00* (2021.01)
*G03B 9/06* (2021.01)
*G03B 30/00* (2021.01)
*H02K 41/035* (2006.01)
*H04M 1/02* (2006.01)
*H04N 23/51* (2023.01)

(52) U.S. Cl.
CPC ......... *G03B 30/00* (2021.01); *H02K 41/0354* (2013.01); *H04M 1/0264* (2013.01); *G03B 2205/0007* (2013.01); *H04N 23/51* (2023.01)

(58) Field of Classification Search
CPC ............. G03B 3/10; G03B 2205/0053; G02B 27/646; H02K 41/0354; H04M 1/0264; H04N 23/51; H04N 23/55; H04N 23/57; H04N 23/54
USPC .......................................... 359/557
See application file for complete search history.

(56) References Cited

U.S. PATENT DOCUMENTS

| | | |
|---|---|---|
| 2019/0052780 A1 | 2/2019 | Sharma et al. |
| 2020/0028998 A1 | 1/2020 | Jun |

FOREIGN PATENT DOCUMENTS

| | | | | |
|---|---|---|---|---|
| CN | 209400775 U | | 9/2019 | |
| CN | 212115444 U | | 12/2020 | |
| EP | 0942309 A2 | * | 9/1999 | |
| JP | 2007108596 A | | 4/2007 | |
| JP | 2010122662 A | * | 6/2010 | ........... G02B 27/646 |
| JP | 2013064963 A | | 4/2013 | |
| JP | 2013101492 A | * | 5/2013 | |
| JP | 2019530899 A | * | 10/2019 | |
| WO | 2016171334 A1 | | 10/2016 | |

* cited by examiner

CAMERA MODULE AND ELECTRONIC DEVICE

CROSS-REFERENCE TO RELATED APPLICATIONS

This application is a continuation of International Application No. PCT/CN2021/074243, filed on Jan. 28, 2021, which claims priority to Chinese Patent Application No. 202020175513.7, filed on Feb. 17, 2020. The disclosures of the aforementioned applications are hereby incorporated by reference in their entireties.

TECHNICAL FIELD

This application relates to the field of terminal device technologies, and in particular, to a camera module and an electronic device.

BACKGROUND

In a single-lens reflex camera, a variable aperture is used to adjust an amount of light entering the camera may have a plurality of levels. The amount of light entering the camera may be adjusted to meet brightness requirements of the camera for different conditions. Installation of the aperture in a lens may need to be highly precise to capture a high-quality image.

With development of science and technology, electronic devices such as mobile phones and tablet computers have an increasingly higher requirement for its image shooting functions. This may allow for the electronic devices to achieve an image shooting effect close to an image shooting effect of a single-lens reflex camera. However, conventionally an assembly method of assembling an aperture and a lens together may be difficult, and may be difficult to be apply to small electronic devices.

SUMMARY

This application provides a camera module and an electronic device, to provide a small electronic device high-quality imaging.

This application discloses a camera module that can be applied to an electronic device such as a mobile phone or a tablet computer. The camera module is integrated with a variable aperture, and can provide higher image shooting with these types of electronic devices. The camera module includes a camera motor, a lens, an image sensor assembly, and a variable aperture. The camera motor includes a focusing part (e.g., focusing component, focusing element), and the focusing part is configured to drive the lens to move in an optical axis direction, to meet a focusing requirement of image shooting. The focusing part may include a base, a carrier, and a driver. The base is equivalent to a fixing part and provides support for another structure, and the carrier is equivalent to a movable part. The driver is fastened on (e.g., coupled to) the carrier, and is configured to drive the carrier to move relative to the base in a specified direction. The specified direction is the optical axis direction of the lens. In the specified direction, the carrier forms an installation hole. The lens is fastened in (e.g., coupled to) the installation hole of the carrier, and may move in the optical axis direction with the carrier to implement focusing. The lens has a light incoming side, the variable aperture is fastened on (e.g., coupled to) the carrier and is located on the light incoming side of the lens. The variable aperture has a light incoming hole, and a diameter of the light incoming hole is adjustable. External light enters the lens after being adjusted by using the variable aperture. The image sensor assembly is disposed on a light emission side of the lens. The image sensor assembly may be fastened on (e.g., coupled to) the base, and light passing through the lens finally arrives at the image sensor assembly for imaging. The image sensor assembly herein may include an image sensor, another external connection assembly, and a support structure.

Both the variable aperture and the lens in the camera module may be disposed on the carrier of the focusing part. The variable aperture and the lens can simultaneously move in the optical axis direction to implement focusing, and the variable aperture is independent of the lens. This reduces assembly difficulty of the camera module and facilitates miniaturization of the camera module. In this way, the camera module can be applied to a small electronic device such as a mobile phone. In addition, adjustment of the variable aperture on the light incoming hole may not be affected by movement of the lens, and a higher-quality image shooting requirement is met.

Because both the lens and the variable aperture are fastened on (e.g., coupled to) the carrier of the focusing part, and the variable aperture may be disposed on the light incoming side of the lens, a support part for bearing the variable aperture is disposed on the carrier. Further, the variable aperture may be fastened on (e.g., coupled to) the support part to facilitate fastening and installation. The support part herein may protrude from the camera motor. The support part may need to be adjusted based on a size of the lens, to meet an installation requirement of the lens and the variable aperture.

In a possible implementation, the camera motor may further include a top cover and a stabilization part. The top cover and the stabilization part cooperate up and down to form accommodation space used to accommodate the focusing part. The focusing part may be fastened to (e.g., coupled to) the stabilization part. When the camera module is used, an image stabilization part (e.g., an image stabilization component, an image stabilization element) may drive the lens to move in a plane perpendicular to the optical axis. Therefore, adverse impact of shaking of the camera module on imaging quality during use is reduced. A first optical hole for light to pass may need to be opened on the top cover, and an axis of the first optical hole is collinear with an optical axis.

In a possible implementation, the driver in the focusing part may include a drive coil and a drive magnet. The drive coil is disposed on the carrier, and the drive magnet is correspondingly disposed on the base. In this way, the drive coil is opposite to the drive magnet, the drive coil is powered on, the drive coil generates an electric field, and the drive magnet is located in the electric field and can be driven to move. Movement of the drive magnet may be adjusted by changing a magnitude and a direction of a current in the drive coil. It may be understood that the drive magnet is disposed on the base, and the drive coil is disposed on the base, to limit a form of relative driving between the drive magnet and the drive coil. In other words, the drive magnet is equivalent to a fixed end, and the drive coil is equivalent to a movable end. Therefore, the drive magnet may alternatively be disposed on another structure, for example, a top cover that is relatively fastened to (e.g., coupled to) the base.

In the camera module provided in embodiments of this application, the variable aperture is independent of the lens, and may be utilized independently of the lens. The variable aperture may include a drive structure and a plurality of blades. The plurality of blades are disposed in an annular manner to form a light incoming hole for light to pass through the lens. The drive structure is configured to drive the plurality of blades to move to change a size of the light incoming hole. Therefore, an amount of light passing through the lens is adjusted. When the variable aperture is utilized independently of the lens, a power supply is added to the drive structure, so that the drive structure can drive the blades to move to change the size of the light incoming hole.

The focusing part may further include a control assembly used as a control apparatus. The control assembly is fastened on (e.g., coupled to) the base. The control assembly is electrically connected to the driver to control an action of the driver. The control assembly may alternatively be electrically connected to the drive structure of the variable aperture by using the connection assembly, to control the drive structure to adjust the size of the light incoming hole of the variable aperture. Therefore, the control assembly herein is connected to the drive structure of the variable aperture by using a signal, and the connection assembly may be used as a structure for electrical signal conduction between the variable aperture and the control assembly.

In a possible implementation, the connection assembly may be implemented in a form of a first spring. The first spring is disposed on a side that is of the carrier and that faces the variable aperture. The first spring is made of a metal material, which may be copper, a copper alloy, or any other suitable material. The first spring is electrically connected to the control assembly and the drive structure of the variable aperture, so that the control assembly is connected to an electrical signal of the variable aperture.

In another possible implementation, the connection assembly may be implemented by using a connection circuit formed by a combination of first springs on the carrier. The connection circuit may be formed by directly cabling (e.g., coupling via a cable) on the carrier, or may be formed by attaching a flexible circuit board to the carrier. The drive structure of the variable aperture is electrically connected to the connection circuit. The first spring herein is similar to the foregoing first spring, and is disposed on a side that is of the carrier base and that faces the variable aperture. A difference lies in that the first spring herein is electrically connected to the control assembly, and is electrically connected to the connection circuit on the carrier. Therefore, in this manner, electrical signals between the drive structure of the variable aperture and the control assembly are jointly implemented by using the first spring and the connection circuit on the carrier.

In the foregoing two implementations, the first spring serves as a carrier for transmitting at least a part of electrical signals between the control assembly and the drive structure of the variable aperture. To enhance an electrical signal transfer effect, the first spring may be divided into a plurality of sub-springs disposed on a same layer based on a specific structure of the first spring. For example, the plurality of sub-springs may be distributed annularly around an optical axis by using the optical axis as a center.

It should be noted that, in addition to being used as an electrical signal carrier, the first spring may alternatively be used as a connector between the carrier and the fixing part (for example, the base, the image stabilization part, or the top cover) of the camera module. Herein, the first spring may be connected between the carrier and the top cover. Correspondingly to the first spring, a second spring may be further disposed on a side that is of the carrier and that faces the image sensor assembly, and the second spring may connect the carrier and the base. The first spring and the second spring are respectively located on two sides of the carrier, and the first spring and the second spring exert a function in opposite directions on the carrier from two opposite directions. In this way, the carrier is equivalent to being in a relatively stable state. Due to the elastic characteristics of the first spring and the second spring, the carrier may still be driven by the driver to move relative to the base.

In the foregoing two implementations, because the first spring serves as a carrier for transmitting at least a part of electrical signals, the first spring belongs to an electrical connection structure. It should be considered that another electrical device (for example, the drive coil and the drive magnet in the driver) is further disposed on the camera module provided in this application. To prevent mutual interference between the first spring and this type of electrical device, an insulation isolation structure may be sandwiched between the first spring and this type of structure. A spacer may be sandwiched between the first spring and the drive magnet, and the carrier may serve as an insulation isolation structure between the first spring and the drive coil. Certainly, a structure of the spacer is not limited, and may be a flat plate or a baffle plate. Certainly, a location at which the insulation isolation structure is disposed relative to the first spring may be determined based on relative locations of other electrical devices. This is not limited herein.

In consideration of structural integrity, the focusing part may further include a housing, and the housing cooperates with the base up and down to form accommodating space for accommodating the carrier and the driver. Certainly, the first spring and the second spring are also accommodated, and a spacing frame may be further sandwiched between the housing and the first spring to implement an isolation function.

Based on the foregoing technical solutions, this application further discloses an electronic device. The electronic device may be a mobile phone or a tablet computer. A camera module is installed on a device body, to implement an image shooting function. The camera module has an aperture that can be adjusted in a plurality of levels, to meet a higher image shooting requirement.

Reference numerals: 10: camera module; 1: camera motor; 11: focusing part; 111: housing; 1111: second optical hole; 112: base; 1121: third optical hole; 113: carrier; 1131: installation hole; 114: driver; 1141: drive coil; 1142: drive magnet; 115: control assembly; 116: first spring; 1161: sub spring; 117: connection circuit; 118: spacer; 119: second spring; 12: top cover; 121: first optical hole; 13: image stabilization part; 14: spacing frame; 2: lens; 3: variable aperture; 31: shell; 32: drive structure; 33: blade; 4: image sensor assembly; 20: mobile phone body; and 100: mobile phone.

DESCRIPTION OF EMBODIMENTS

In a single-lens reflex camera, a variable aperture is a structure that can be used with a shutter to adjust an amount of light passing through the camera. Currently, the variable aperture applied to the single-lens reflex camera is generally installed in a lens. This may impose a highly difficult requirement on an assembly of a camera module. Therefore, the camera module having the variable aperture may be difficult to implement in electronic devices such as a mobile phone and a tablet computer. Therefore, this application provides a camera module where a structure of the lens is independent of a structure of the variable aperture and where the lens moves synchronously with the variable aperture to adjust its focus. Therefore, difficulty of assembling the camera module is reduced. Based on this structure, a lighter and thinner camera module can be more easily designed and implemented. Therefore, the camera module may be applied to a small electronic device, to meet increasingly improved imaging quality requirements for small electronic devices. It may be understood that the electronic device herein may be a mobile phone, a tablet computer, a vehicle-mounted monitoring system, or the like.

To describe the technical solutions in embodiments of this application more clearly, the following further describes in detail the camera module provided in this application with reference to the accompanying drawings. It should be understood that terms such as "first" and "second" in the following are merely used for distinguishing and description, and cannot be understood as an indication or implication of relative importance or an indication or implication of an order.

Figure 1:
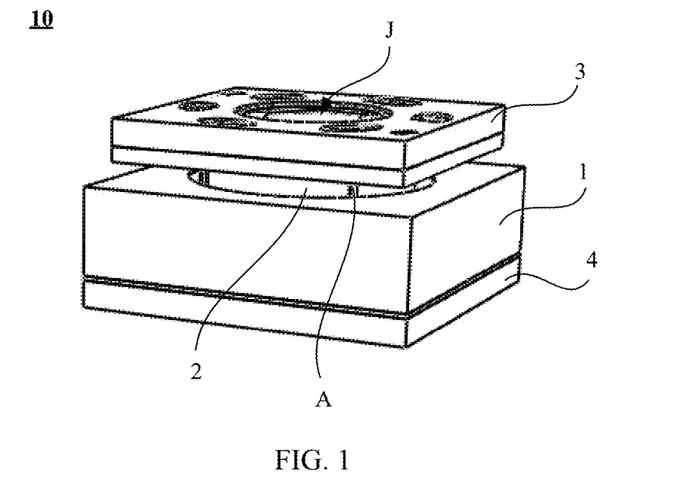
FIG. 1 is a schematic diagram of a structure of a camera module according to this application.

Embodiments of this application provide for a camera module 10. As shown in FIG. 1, the camera module 10 includes a camera motor 1, a lens 2, a variable aperture 3, and an image sensor assembly 4. The camera motor 1 is equivalent to a power source of the camera module 10, and is configured to drive the lens 2 and the variable aperture 3 to move when a camera is in operation; in order to meet an imaging requirement. FIG. 1 further shows a light incoming hole J formed by the variable aperture 3. When the camera is in operation, external light enters the lens 2 through the light incoming hole J of the variable aperture 3, passes through the lens 2, and is projected onto the image sensor assembly 4 for imaging. The lens 2 is installed in the camera motor 1 in the manner shown in FIG. 1, so that light passing through the lens 2 can reach the image sensor assembly 4 at an end of the camera motor 1 and that is away from the variable aperture 3 for imaging. The variable aperture 3 may be fastened to (e.g., coupled to) the camera motor 1 by using a support part A protruding from the camera motor 1, so that both of the variable aperture 3 and the lens 2 may be driven by the camera motor 1. The image sensor assembly 4 herein includes an image sensor, another external connection assembly, and a support structure.

Figure 2:
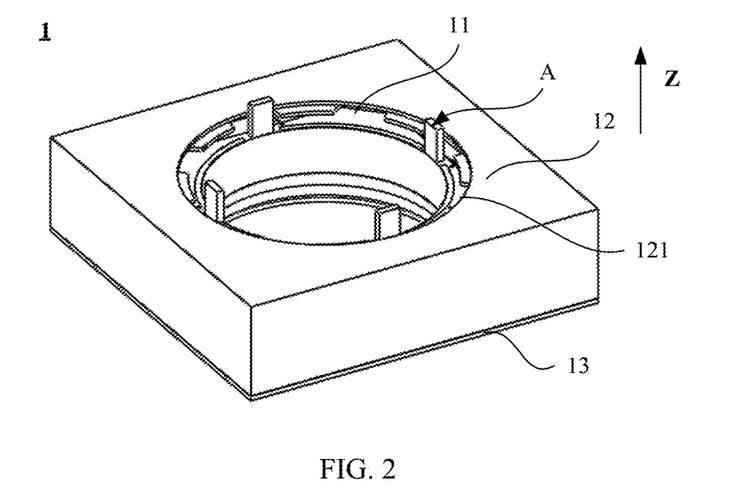
FIG. 2 is a schematic diagram of a structure of a camera motor in a camera module according to this application.

In the structure of the camera motor 1 shown in FIG. 2, the camera motor 1 includes a focusing part 11, a top cover 12, and an image stabilization part 13. The top cover 12 and the image stabilization part 13 cooperate upwards and downwards to form an accommodation space used to accommodate the focusing part 11. The focusing part 11 is fastened to (e.g., coupled to) the image stabilization part 13. The lens 2 and the variable aperture 3 are fastened on (e.g., coupled to) the focusing part 11. The focusing part 11 may drive the lens 2 and the variable aperture 3 to move in an optical axis direction (that is, a direction Z shown in FIG. 2), to implement focusing. The image stabilization part 13 may drive the focusing part 11 to move on a surface perpendicular to the optical axis direction, to implement an image stabilization effect of the lens 2. The support part A configured to support and fasten the variable aperture 3 may be disposed on the focusing part 11, and extends out of the camera motor 1. On the top cover 12, a first optical hole 121 for light to pass through is formed, and an axis of the first optical hole 121 is collinear with an optical axis.

Figure 3:
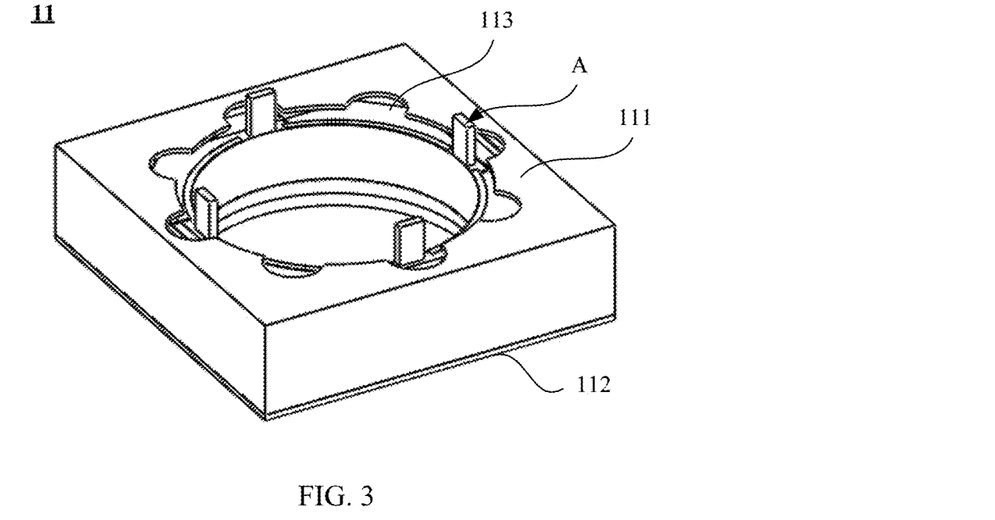
FIG. 3 is a schematic diagram of a structure of a focusing part in a camera module according to this application.

For some embodiments of a structure of the focusing part 11, refer to FIG. 3. FIG. 3 shows a three-dimensional structure of the focusing part 11. The focusing part 11 may include a housing 111, a base 112, a carrier 113, and a driver 114. The housing 111 cooperates with the base 112 to form an accommodation space for accommodating the carrier 113 and the driver 114. Due to the housing 111 blocking the driver 114, a structure of the driver 114 is not shown in FIG. 3.

Figure 4:
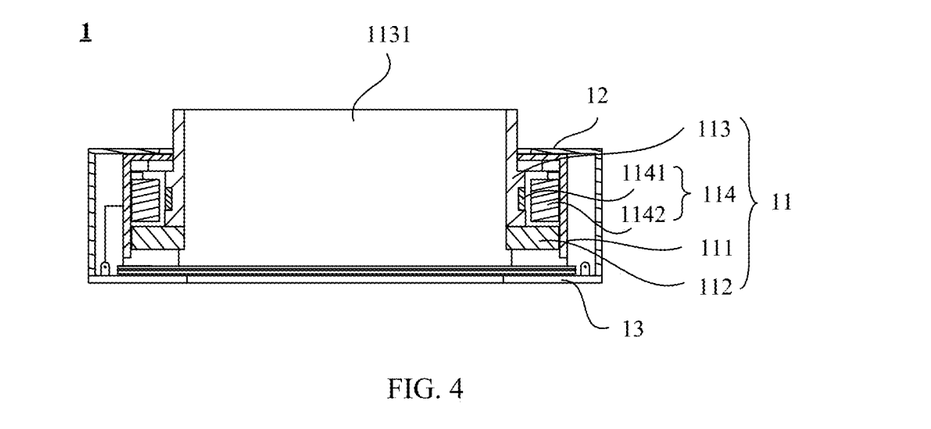
FIG. 4 is a schematic diagram of a cross-section structure of a focusing part in a camera module according to this application.

With reference to the structures in FIG. 2 and FIG. 3, refer to a schematic diagram of a cross-sectional structure of the camera motor 1 shown in FIG. 4. The driver 114 in the focusing part 11 is implemented in a form of a drive coil 1141 and a drive magnet 1142. The drive coil 1141 is disposed on the carrier 113, and the drive magnet 1142 may be fastened on (e.g., coupled to) the base 112. When the camera motor 1 is in operation, the base 112 is equivalent to a fixing part, the carrier 113 is equivalent to a movable part, and the driver 114 is configured to drive the carrier 113 to move relative to the base 112 in an optical axis direction. In this way, the drive coil 1141 is opposite to the drive magnet 1142. When the drive coil 1141 is powered on, the drive coil 1141 generates an electric field, and the drive magnet 1142 located in the electric field may be driven to move. Movement of the drive magnet 1142 may be adjusted by changing a magnitude and a direction of a current in the drive coil 1141. Certainly, the driver 114 may alternatively be implemented in another form. This is not limited herein. In addition, in these embodiments, the drive coil 1141 is disposed on the carrier 113 and is equivalent to a movable end of the driver 114, and the drive magnet 1142 is fastened on (e.g., coupled to) the base 112. The drive magnet 1142 may then be equivalent to a fixed end of the driver 114, to implement relative drive motion. Therefore, the drive magnet 1142 may alternatively be disposed on another structure that is fastened relative to the base 112. For example, the drive magnet 1142 may alternatively be fastened on (e.g., coupled to) the top cover 12, and an effect of driving the drive coil 1141 by the drive magnet 1142 can still be achieved.

Figure 5:
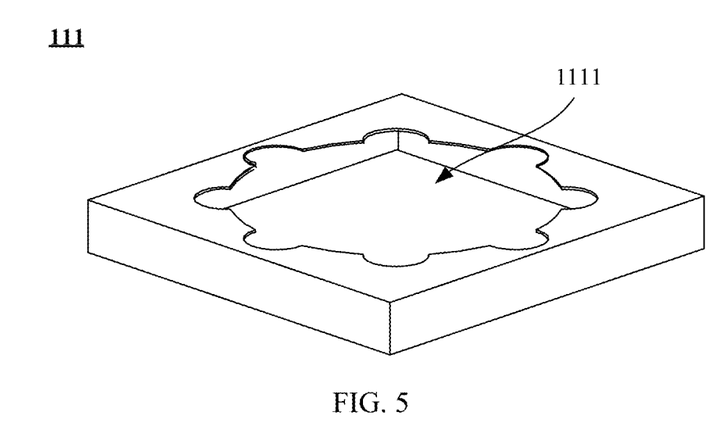
FIG. 5 is a schematic diagram of a structure of a housing of a focusing part in a camera module according to this application.
Figure 6:
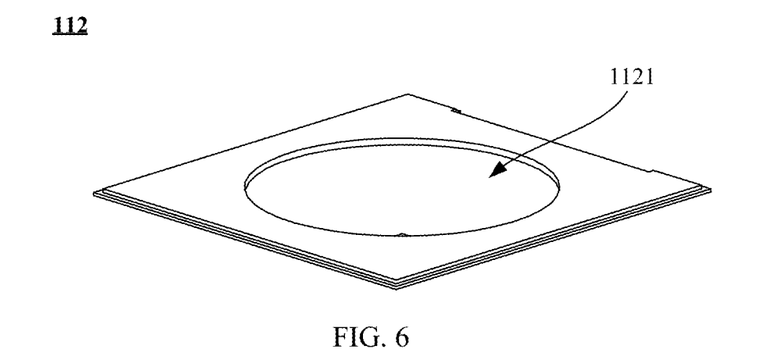
FIG. 6 is a schematic diagram of a structure of a base of a focusing part in a camera module according to this application.

Both the variable aperture 3 and the lens 2 in the camera module 10 are disposed on the carrier 113 of the focusing part 11, the variable aperture 3 and the lens 2 can simultaneously move in the optical axis direction to implement accurate focusing, and the variable aperture 3 is independent of the lens 2. This may reduce assembly difficulty of the camera module 10, and facilitates miniaturization of the camera module 10. In this way, the camera module 10 can be applied to a small electronic device such as a mobile phone. In addition, adjustment of the variable aperture 3 on the light incoming hole may not be affected by movement of the lens 2, and a higher-quality image shooting requirement is met. For a structure of the housing 111, refer to FIG. 5. A second optical hole 1111 for light to pass through is formed on the housing 111. A specific shape of the second optical hole 1111 is not limited herein, and a shape in FIG. 5 is merely an example. For a structure of the base 112, refer to FIG. 6. A third optical hole 1121 for light to pass through is formed on the base 112. It may be understood that when the camera motor 1 and the lens 2 are assembled, axes of both of the second optical hole 1111 and the third optical hole 1121 are collinear with an optical axis of the lens 2.

Figure 7:
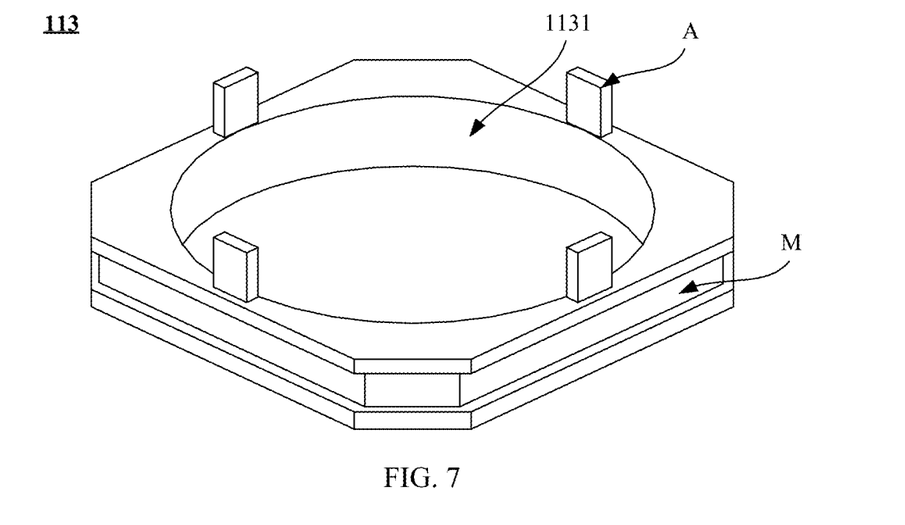
FIG. 7 is a schematic diagram of a structure of a carrier of a focusing part in a camera module according to this application.

For a structure of the carrier 113, refer to FIG. 7. An installation hole 1131 is formed on the carrier 113. When the installation hole 1131 is assembled and cooperates with the lens 2, the lens 2 is fastened in (e.g., coupled to) the installation hole 1131. An axis of the installation hole 1131 may be collinear with the optical axis of the lens 2, to achieve a desired imaging effect. The support part A for fastening the variable aperture 3 is formed on the carrier 113.

Figure 8:
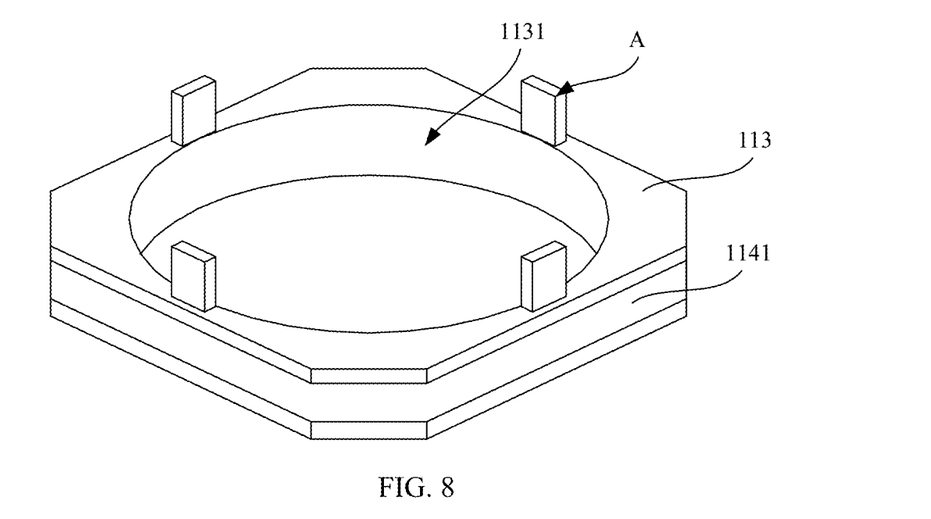
FIG. 8 is a schematic diagram of a structure in which a drive coil is disposed on the carrier in FIG. 7.

In the structure of the driver 114 shown in FIG. 4, the drive coil 1141 is disposed on the carrier 113. In a possible implementation, with reference to the structure of the carrier 113 shown in FIG. 7, an installation groove M is formed on a periphery of the carrier 113, and the drive coil 1141 is disposed in the installation groove M, to obtain a structure shown in FIG. 8.

Figure 9:
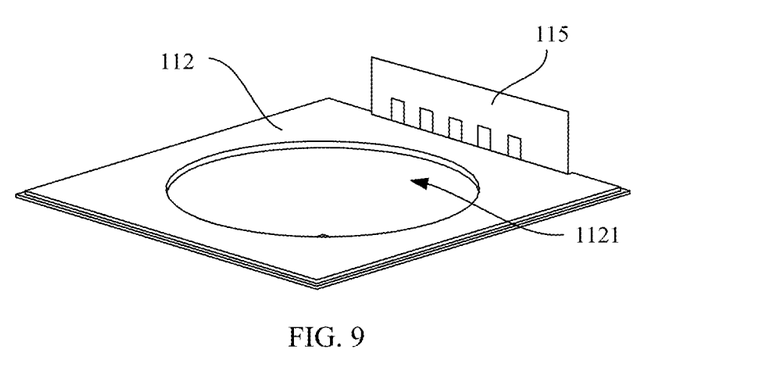
FIG. 9 is a schematic diagram of a structure in which a base and a control assembly in a camera module are connected according to this application.

To control the driver 114, the focusing part 11 further includes a control assembly 115. As shown in FIG. 9, the control assembly 115 may be disposed on the base 112. The control assembly 115 herein may control the driver 114, and may further exchange information with an external main control structure. In the structure shown in FIG. 9, the control assembly 115 is disposed on the base 112 in a manner in which one end of the control assembly 115 is fastened on (e.g., coupled to) the base 112. The control assembly 115 may alternatively be integrated on the base 112 in a form of attachment, or may be disposed on the base 112 in another structure form. This is not limited herein. The control assembly 115 may be a part of the camera module 10 in some embodiments. Certainly, the control assembly 115 may alternatively be disposed in another structure, which does not affect function implementation of the control assembly 115.

Figure 10:
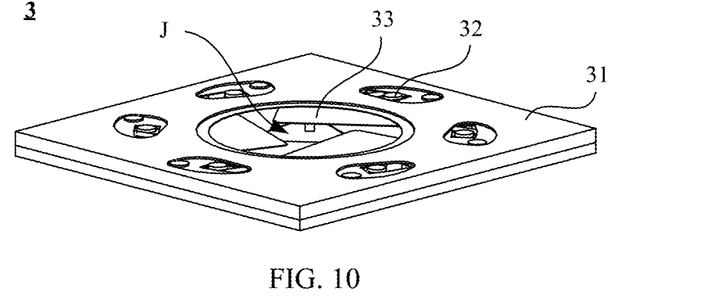
FIG. 10 is a schematic diagram of a structure of a variable aperture in a camera module according to this application.

It should be noted that in the camera module 10 provided in embodiments of this application, the variable aperture 3 is not only relatively independent of the lens 2 in structure, but also may work independently of the lens 2. The structure shown in FIG. 10 may be used as a reference for the variable aperture 3. The variable aperture 3 includes a housing 31, a drive structure 32 disposed in the housing 31, and a plurality of blades 33. The plurality of blades 33 are disposed annularly to form the light incoming hole J. An axis of the light incoming hole J herein may be collinear with an axis of the lens 2. The plurality of blades 33 may rotate under driving of the drive structure 32, to change a size of the light incoming hole J and change an amount of light passing through the light incoming hole J. When the variable aperture 3 is used independently, as long as a power supply is applied to the drive structure 32, the drive structure 32 may be started, to drive the blades 33 to rotate to change the size of the light incoming hole J.

In embodiments, operation of the variable aperture 3 may be further controlled by the control assembly 115. To control the variable aperture 3 by the control assembly 115, a structure that can transmit electrical signals needs to be formed between the control assembly 115 and the drive structure 32 of the variable aperture 3.

Figure 11:
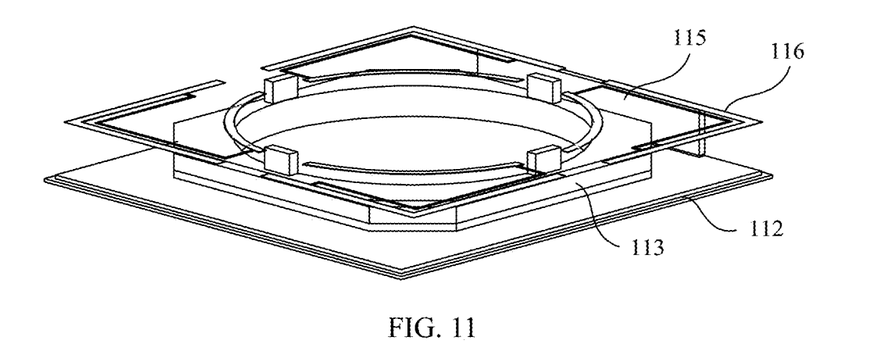
FIG. 11 is a schematic diagram of a structure of a first spring, a carrier, a control assembly, and a base in a camera module according to this application.
Figure 12:
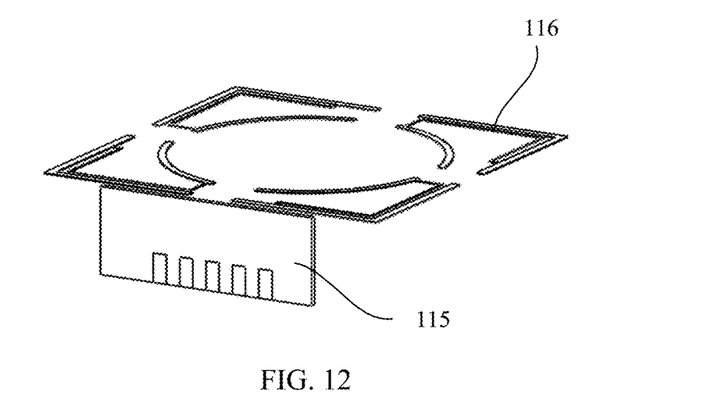
FIG. 12 is a schematic diagram of a structure in which a first spring and a control assembly in a camera module are connected according to this application.

In embodiments, as shown in FIG. 11, a first spring 116 is disposed on a side that is of the carrier 113 and that faces the variable aperture 3. The first spring 116 is electrically connected to the control assembly 115 fastened on (e.g., coupled to) the base 112 (as shown in FIG. 12). The first spring 116 may be made of a metal material, which may be copper, copper alloy, or another metal or metal alloy with good conductivity. The first spring 116 may serve as a carrier for transmitting electrical signals between the variable aperture 3 (e.g., via a first conduit) and the control assembly 115 (e.g., via a second conduit). Therefore, a structure in which the control assembly 115, the first spring 116, and the drive structure 32 of the variable aperture 3 are connected may be shown in FIG. 13.

Figure 13:
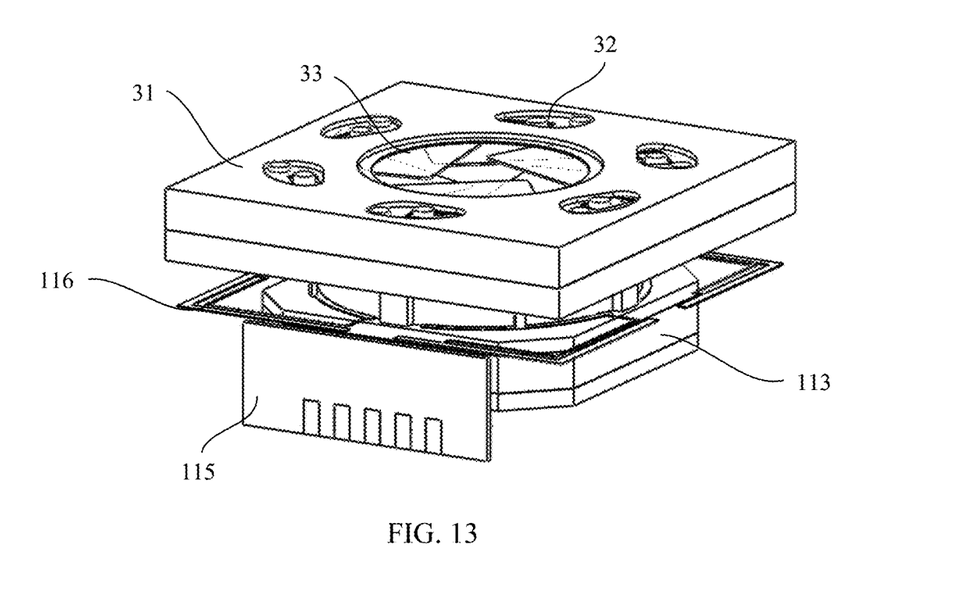
FIG. 13 is a schematic diagram of a structure in which a variable aperture in a camera module is electrically connected to a control assembly by using a first spring according to this application.
Figure 14:
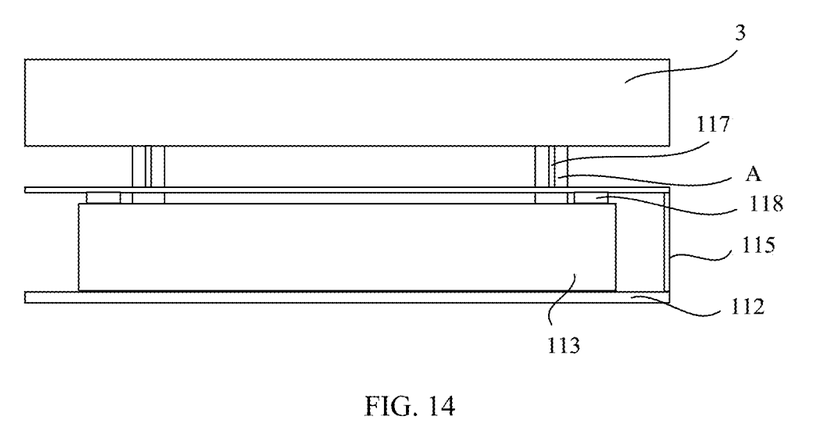
FIG. 14 is a schematic diagram of a structure in which a variable aperture in a camera module is electrically connected to a control assembly by using a first spring and a connection circuit according to this application.

In embodiments, similar to the structure shown in FIG. 13, a difference lies in that the first spring 116 is not directly in contact with the drive structure 32 of the variable aperture 3 to implement electrical connection. Instead, as shown in FIG. 14, a connection circuit 117 electrically connected to the drive structure 32 of the variable aperture 3 may be formed on the support part A of the carrier 113, and the connection circuit 117 is electrically connected to the first spring 116. In this way, electrical signal transmission between the drive structure 32 of the variable aperture 3 and the control assembly 115 is implemented by using the connection circuit 117 and the first spring 116. Herein, the connection circuit 117 formed on the carrier 113 may be formed by directly cabling on the carrier 113, or the connection circuit 117 may be formed by integrating a flexible circuit into the carrier 113.

Figure 15:
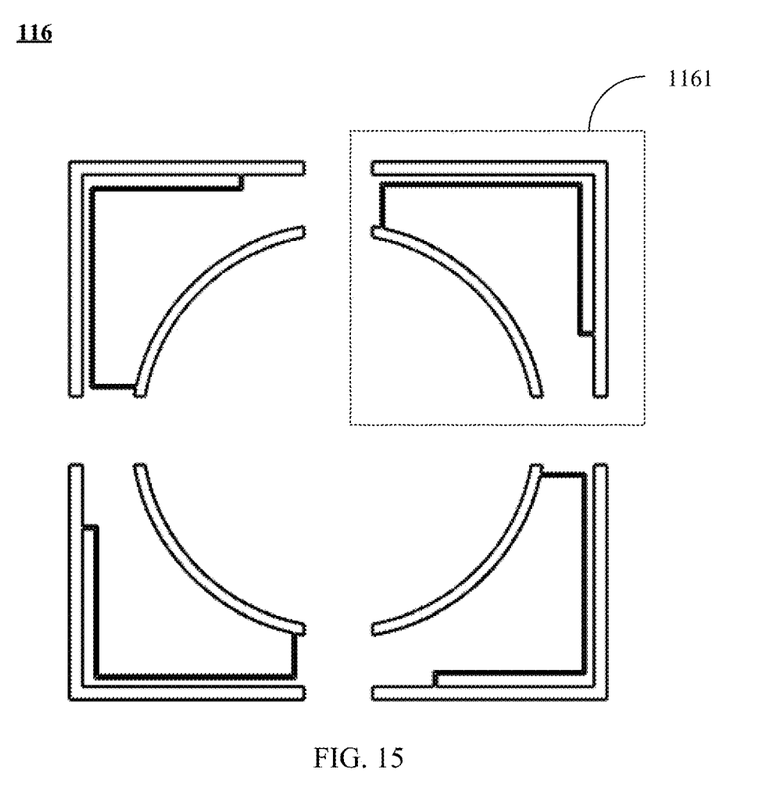
FIG. 15 is a schematic diagram of a structure of a first spring in a camera module according to this application.

In the foregoing embodiments, the first spring 116 serves as a carrier for transmitting at least a part of electrical signals between the control assembly 115 and the drive structure 32 of the variable aperture 3. To enhance an electrical signal transfer effect, the first spring 116 may be divided into a plurality of sub-springs 1161 disposed on a same layer based on a specific structure of the first spring 116. In a structure of the first spring 116 shown in FIG. 15, the plurality of sub-springs 1161 may be distributed annularly around an optical axis by using the optical axis as a center.

Figure 16:
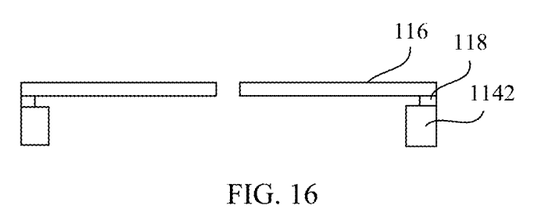
FIG. 16 is a schematic diagram of a structure in which a spacer is sandwiched between a first spring and a drive magnet in a camera module according to this application.

In addition, in the foregoing embodiments, because the first spring 116 serves as a carrier for transmitting at least a part of electrical signals, the first spring 116 belongs to an electrical connection structure. It should be considered that another electrical device (for example, the drive coil 1141 and the drive magnet 1142 included in the driver 114) may be further disposed on the camera module 10 provided in some embodiments. To prevent mutual interference between the first spring 116 and this type of electrical device, an insulation isolation structure may be sandwiched between the first spring 116 and this type of electrical device. For example, as shown in FIG. 16, a spacer 118 may be sandwiched between the first spring 116 and the drive magnet 1142. Based on the structure shown in FIG. 8, the drive coil 1141 is disposed in the groove of the carrier 113, and the carrier 113 serves as an insulation isolation structure between the first spring 116 and the drive coil 1141. Certainly, a structure of the spacer 118 is not limited, and may be a flat plate or a baffle plate. In addition, a location at which the spacer 118 is disposed relative to the first spring 116 may also be determined based on relative locations of other electrical devices. This is not limited herein.

Figure 17:
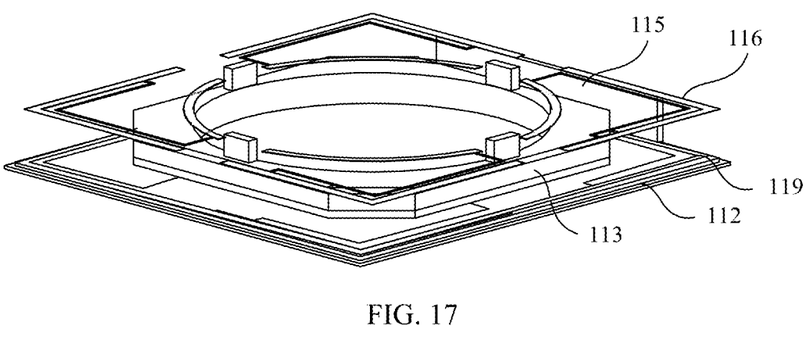
FIG. 17 is a schematic diagram of a structure in which a first spring and a second spring are respectively disposed on two sides of a carrier in a camera module according to this application.

It should be noted that, in addition to being used as an electrical signal carrier, the first spring 116 may alternatively be used as a connector between the carrier 113 and the fixing part (for example, the base 112 or the housing 111) of the camera module 10. Herein, the first spring 116 may be connected between the carrier 113 and the housing 111. Corresponding to the first spring 116, as shown in FIG. 17, a second spring 119 may be further disposed on a side that is of the carrier 113 and that faces the image sensor assembly 4, and the second spring 119 may be connected to the carrier 113 and the base 112. Because the first spring 116 and the second spring 119 are respectively located on two sides (e.g., the upper and lower sides shown in FIG. 17) of the carrier 113, the first spring 116 and the second spring 119 exert action forces in opposite directions on the carrier 113 from two opposite directions, so that the carrier 113 is in a relatively stable state. Certainly, due to elastic characteristics of the first spring 116 and the second spring 119, the carrier 113 may still be driven by the driver 114 to move relative to the base 112.

Figure 18:
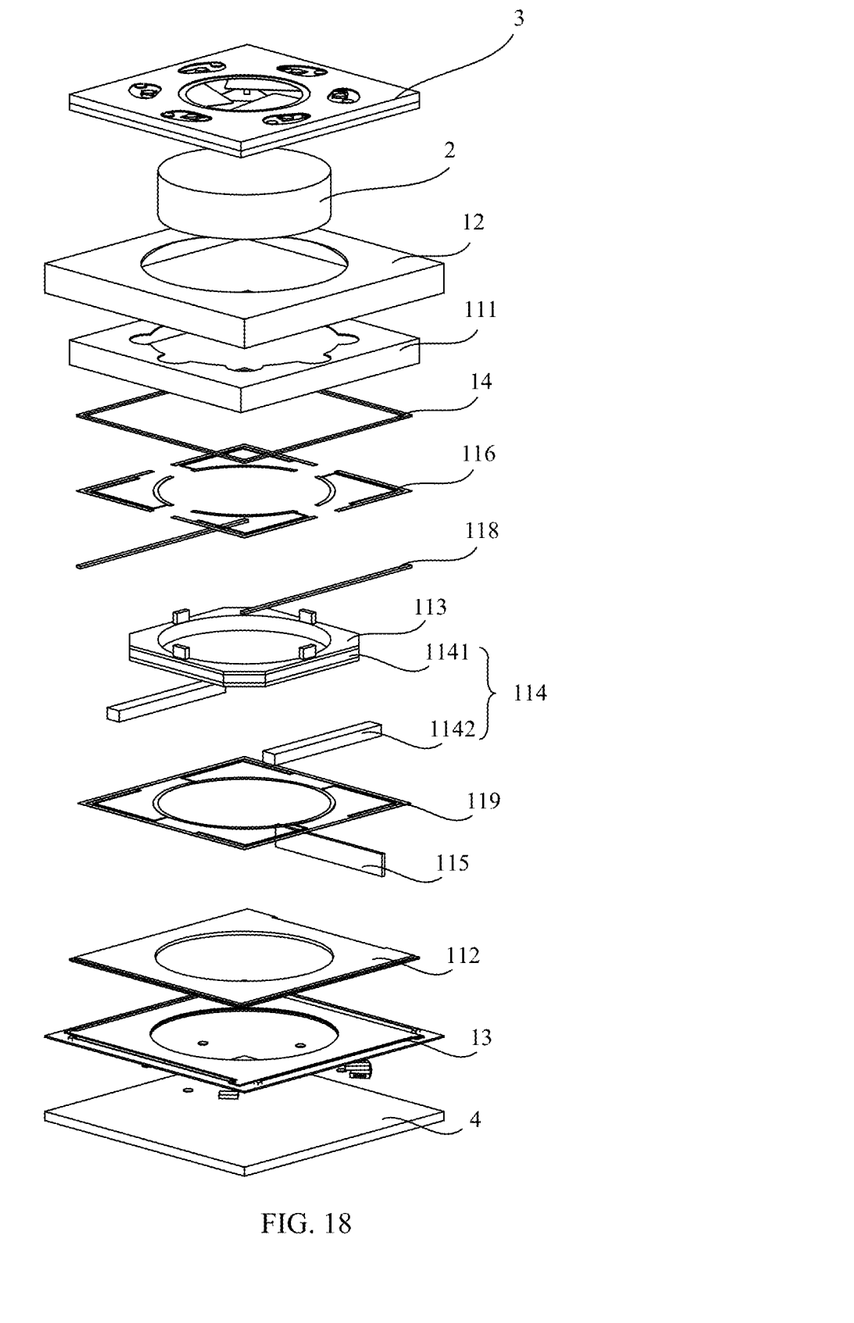
FIG. 18 is an exploded view of a camera module according to this application.

Based on the foregoing description of the structure of the camera module 10 provided in this application, refer to an exploded view of a structure of the camera module 10 shown in FIG. 18. As shown in FIG. 18, in the camera module 10, the driver 114 is implemented by using the drive coil 1141 in cooperation with the drive magnet 1142, the drive coil 1141 surrounds a periphery of the carrier 113, and the drive magnet 1142 is implemented by using two symmetric strip magnets to cooperate with the drive coil 1141. The first spring 116 is separated from the drive magnet 1142 by using two long-strip-shaped spacers 118. A rectangular spacing frame 14 may be further sandwiched between the housing 111 and the first spring 116 to prevent the first spring 116 from contacting the housing 111. Certainly, the spacing frame 14 may alternatively be implemented in another shape. This is not limited herein. Other structures are described above, and details are not described herein again. FIG. 18 provides a structure of the camera module 10 according to some embodiments. These embodiments in no way limit the structure of the camera module 10 disclosed in this application.

Figure 19:
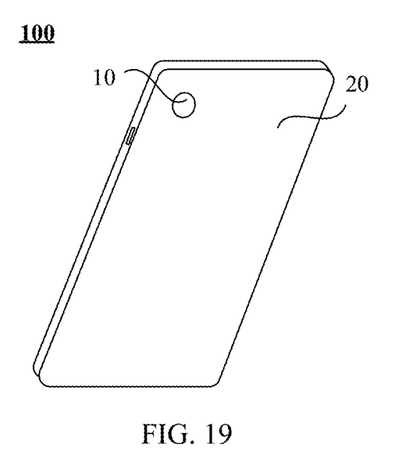
FIG. 19 is a schematic diagram of a structure of an electronic device according to this application.

Because a structure of the camera module 10 may be miniaturized, the camera module 10 may be applied to a small electronic device. Therefore, based on the camera module 10, this application further provides an electronic device. The electronic device may be a mobile phone, a tablet computer, or a vehicle-mounted surveillance device, and is a small device with high portability. The camera module 10 is installed on a device body, to implement an image shooting function of these electronic devices. A mobile phone 100 shown in FIG. 19 is used as an example. The mobile phone 100 has a mobile phone body 20. The camera module 10 is installed on a back surface of the mobile phone body 20, is equivalent to a rear-view camera structure of the mobile phone 100, and is configured to implement a rear-view image shooting function.

It is clear that a person skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

What is claimed is:

1. A camera module, comprising:
    a camera motor comprising a focusing element, the focusing element comprising a base, a carrier, a control assembly, and a driver, wherein the driver is coupled to the base and is configured to drive the carrier to move relative to the base in a specified direction, and, in the specified direction, an installation hole is formed on the carrier;
    a lens disposed in the installation hole, wherein an optical axis of the lens is parallel to the specified direction; a variable aperture coupled to the carrier and is located on a light incoming side of the lens, wherein the variable aperture is independent of the lens so that adjustment of the variable aperture is not affected by movement of the lens; and
    an image sensor assembly disposed at an end of the base and is further disposed away from a variable aperture;
    wherein the control assembly is electrically coupled to the driver and is electrically coupled to the variable aperture via a connection assembly, and wherein the connection assembly comprises a first spring disposed on a first side of the carrier facing the variable aperture, the first spring being electrically coupled to the variable aperture and being electrically coupled to the control assembly separate to being electrically coupled to the variable aperture.

2. The camera module according to claim 1, wherein:
    the connection assembly comprises the first spring and a connection circuit formed on the carrier, the connection circuit being electrically coupled to the variable aperture;
    and
    the first spring is electrically coupled to the connection circuit and is electrically coupled to the control assembly separate to being electrically coupled to the connection circuit.

3. The camera module according to claim 2, wherein an insulation isolation structure is disposed between the first spring and the driver.

4. The camera module according to claim 1, wherein the first spring comprises a plurality of sub-springs disposed at a same layer.

5. The camera module according to claim 1, wherein the focusing element further comprises a second spring disposed on a second side of the carrier facing the image sensor assembly.

6. The camera module according to claim 1, wherein the driver comprises a drive coil disposed on the carrier and a drive magnet disposed on the base.

7. The camera module according to claim 1, wherein:
the camera motor further comprises a top cover and an image stabilization element; and
the top cover cooperates with the image stabilization element to form an accommodating space to accommodate the focusing element; and
the focusing element is coupled to the image stabilization element.

8. The camera module according to claim 1, wherein the variable aperture comprises a drive structure and a plurality of blades, the plurality of blades are distributed annularly to form a light incoming hole for light to pass through, and the drive structure is configured to drive the plurality of blades to rotate, thereby changing a size of the light incoming hole.

9. An electronic device, comprising a device body and a camera module, the camera module comprising:
a camera motor comprising a focusing element, the focusing element comprising:
a base,
a carrier forming an installation hole in a specified direction,
a control assembly, and
a driver fastened to the base and is configured to drive the carrier to move relative to the base in the specified direction;
a lens disposed in the installation hole, an optical axis of the lens being parallel to the specified direction; a variable aperture coupled to the carrier and is located on a light incoming side of the lens, wherein the variable aperture is independent of the lens so that adjustment of the variable aperture is not affected by movement of the lens; and
an image sensor assembly disposed at an end of the base and away from a variable aperture;
wherein the control assembly is electrically coupled to the driver, and the control assembly is electrically coupled to the variable aperture via a connection assembly, and wherein the connection assembly comprises a first spring disposed on a first side of the carrier facing the variable aperture, the first spring being electrically coupled to the variable aperture and being electrically coupled to the control assembly separate to being electrically coupled to the variable aperture.

10. The electronic device according to claim 9, wherein:
the connection assembly comprises the first spring and a connection circuit formed on the carrier, the connection circuit being electrically coupled to the variable aperture; and
the first spring is disposed on a side of the carrier facing the variable aperture, and the first spring is electrically coupled to the connection circuit and electrically coupled to the control assembly separate to being electrically coupled to the connection circuit.

11. The electronic device according to claim 10, wherein an insulation isolation structure is disposed between the first spring and the driver.

12. The electronic device according to claim 9, wherein the first spring comprises a plurality of sub-springs disposed at a same layer.

13. The electronic device according to claim 9, wherein the focusing element further comprises a second spring, and the second spring is disposed at a second side of the carrier facing the image sensor assembly.

14. The electronic device according to claim 9, wherein the driver comprises a drive coil disposed on the carrier and a drive magnet disposed on the base.

15. The electronic device according to claim 9, wherein the camera motor further comprises a top cover and an image stabilization element; and
the top cover cooperates with the image stabilization element to form an accommodating space to accommodate the focusing element, and the focusing element is coupled to the image stabilization element.

16. The electronic device according to claim 9, wherein the variable aperture comprises a drive structure and a plurality of blades, the plurality of blades are distributed annularly to form a light incoming hole for light to pass through, and the drive structure is configured to drive the plurality of blades to rotate, thereby changing a size of the light incoming hole.

* * * * *